Oct. 20, 1959     B. J. BLUMBERG     2,909,322
AIR-ESCAPE VALVE
Filed March 17, 1958
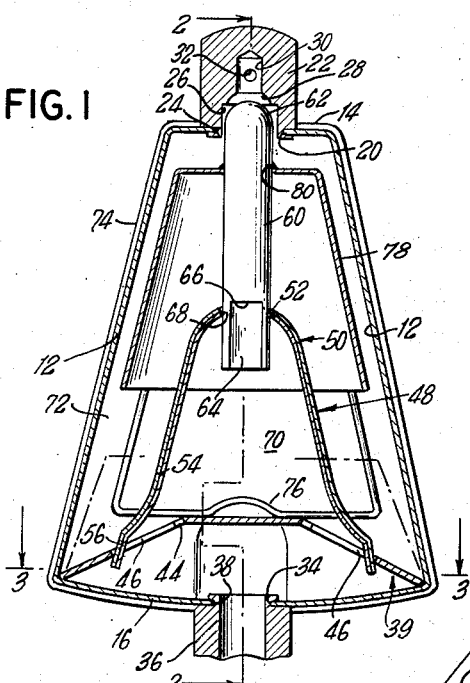
FIG. 1
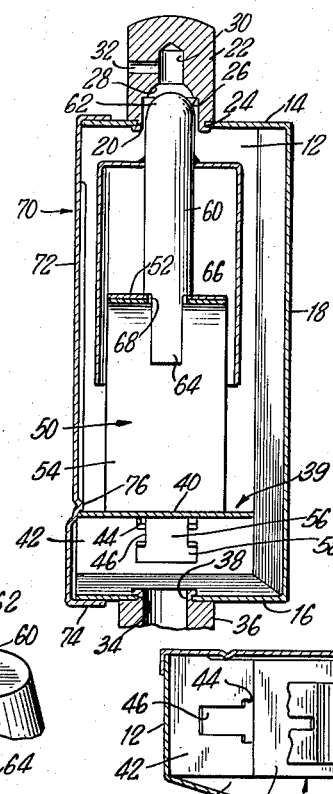
FIG. 2
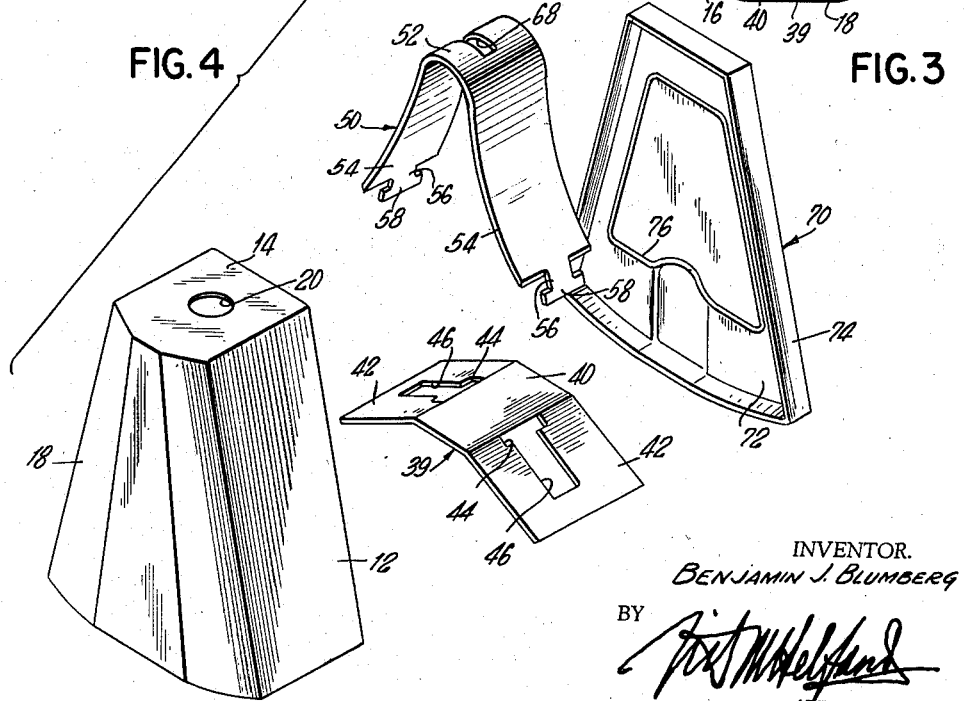
FIG. 4     FIG. 3
INVENTOR.
BENJAMIN J. BLUMBERG
BY
ATTORNEY United States Patent Office 2,909,322
Patented Oct. 20, 1959

2,909,322

AIR-ESCAPE VALVE

Benjamin J. Blumberg, New York, N.Y.

Application March 17, 1958, Serial No. 721,970

13 Claims. (Cl. 236—66)

The present invention relates to an air-escape valve, such as a relief and pressure release valve, especially adapted for use in steam circulating systems, as for attachment to the radiators of steam heating systems, and is particularly directed to a thermostatically controlled air-escape valve of the type utilizing a bimetallic element responsive to variations in temperature. The present invention is an extension of and improvement on the air-escape valve of my invention described and claimed in my co-pending application Serial No. 709,496, filed January 17, 1958.

In my said copending application, I have described and claimed a thermostatic, bimetallic air-escape valve in which the closing of the valve is effected through the action of heat on an inverted, substantially V-shaped bimetallic element preferably having outwardly flaring ends, which supports, at its apex the male valve element that is at all times disposed at least loosely within a valve seat. The bimetallic element is so formed and shaped that, when subjected to heat, its legs tend to elongate and converge. These legs also have their ends supported upon inwardly and upwardly rising ramps upon which the converging leg ends ride upwardly as they converge, thereby providing a double action upward movement of the supported valve head into the valve seat, to seal the valve.

In my said copending application, I have also indicated a method for interengaging the element end with the supporting ramps by making the ramps in the form of relatively narrow embossments disposed on the bottom of the valve housing and by providing corresponding debossments on the ends of the bimetallic element legs that fit over the ramp embossments.

The present invention is directed, primarily to an air-escape valve of the character described having improved means for interengaging the ends of its bimetallic element legs with their supporting ramps, to make such interengagement more positive and substantially completely proof against any displacement of the legs from the ramps or their shifting on the ramps in the course of their upward movement thereon, to thereby make the operation of the valve more effective and more certain.

It is also an object of the present invention to provide an air escape valve of the character described in which the several parts comprising the same, though not fixedly secured on one another, are, nevertheless, firmly and securely assembled in place, to prevent any relative displacement between them that might interfere with the operation of the valve or might render it completely inoperative.

It is another object of the present invention to provide an air-escape valve of the character described presenting a more effective and efficient means for the run-off of any water that may enter the housing thereof, either as a result of the inadvertent inflow or of steam condensation, that might, if not drawn off, cause knocking in the system or flood the valve.

It is a further object of the present invention to provide an improved air-escape valve of the character described which will retain the advantages of the ease and simplicity of construction and assembly as well as the economy of production of the valve of my said copending application.

It is a further object of the present invention to provide an air escape valve of the character described which is of attractive and ornamental appearance.

The foregoing and other objects and advantages of the thermostatic, bimetallic air-escape valve of the present invention will become more readily apparent to those skilled in the art from the embodiment of the invention shown in the accompanying drawing and from the description following. It is to be understood, however, that such embodiment is shown by way of illustration only, to make the principles and practice of the invention more readily comprehensible, and without any intent of limiting the invention to the specific details therein shown.

In the drawings:

Fig. 1 is a vertical, sectional view through the width of one embodiment of an air-escape valve of the present invention;

Fig. 2 is a section taken through the thickness thereof, on line 2—2 of Fig. 1;

Fig. 3 is a section taken on line 3—3 of Fig. 1; and

Fig. 4 is an exploded view of the several parts forming the assembled valve shown in Fig. 1, with the valve-seat and outlet plug omitted.

Referring now in greater detail to the air-escape valve shown in the accompanying drawing, the same comprises a casing, generally designated as 10, open on one side, and consisting of preferably upwardly converging, substantially rectangular end walls, 12, connected at the top by a wall, 14, which is preferably flat, and at the bottom by the relatively larger and preferably convex wall, 16. The casing 10 also includes a preferably outwardly bulging side wall, 18, which is preferably of polygonal shape, consisting of three downwardly widening triangular panels, as clearly shown in Fig. 4 of the drawings; the top and bottom walls, 14 and 16, being shaped in conformity with the polygonal bulge of the sidewall 18.

The top wall 14 is formed with an approximately central opening, 20, into which is set and secured, in any desired manner, a plug, 22. In the illustrative embodiment, the plug 22 is shown as formed with a relatively short neck, 24, of reduced thickness, at its bottom, which is adapted to fit snugly in the opening 20, and with a recess, 26, at its lower portion, which renders the neck 24 relatively thin-walled, so that its end which is disposed within the casing may be swaged to engage the marginal edge portion of the opening 22, to secure the plug 20 in place. The recess 26 is formed with a dome-shaped inner end portion, 28, which may be of slightly reduced radius and is adapted to form a valve seat, and at the top center of which is provided an upwardly extending recess, 30, which is connected by the relatively narrow passageway, 32, to the exterior of the plug 20, above the casing 10.

The bottom wall 16 is also provided with a substantially central opening, 34, into which may be secured a nipple, 36, by which the valve may be connected to a radiator outlet. The nipple 36 may be secured in place in any desired manner, as by its reduced neck portion, 38, the edge of which may be swaged over the inner marginal edge portion of the opening 34.

Disposed within the casing 10, on the bottom wall 16 thereof, is a preferably relatively rigid metallic strip of a width equal substantially to the width of an end wall 12 and bent to provide central portion, 40, and end portions of substantially equal size and offset at an angle to the central portion 40, designated as 42. The strip is disposed within the casing with its end portions 42 in dependent relation to the central portion 40, and is of a length that its end edges are tightly fitted in the corners formed by the bottom wall 16 with each of the end walls 12, and, because such angles are somewhat acute because of the convergent relation of the end walls 12, the strip ends are held relatively securely in place against upward displacement.

The inwardly and upwardly rising ramps formed by the strip end portions 42 are each provided with a T-shaped slot having a relatively thin transverse, 44, which is closely adjacent and parallel to the inner edge of the ramp 42 and the relatively wider leg portion, 46, which extends lengthwise of the ramp and terminates short of its lower end.

The ramps 42 support a bimetallic, heat responsive element, generally designated as 50, which comprises an elongated, rectangular bimetallic strip of a width equal substantially to the width of an end wall 12 of the casing 10. The bimetallic strip is bent into substantially V-shape, with a preferably rounded apex, 52, and gradually outwardly curving leg portions, 54. The leg portions are each formed with an inverted T-shaped elongation or extension, consisting of the connecting leg or neck, 56, which is of a width slightly less than the slot portion 46, and of the transverse or head portion, 58, which is of greater width than such slot portion 46 but of lesser width than the slot portion 44. The bimetallic element 50 is disposed in inverted position with the ends of its legs 54 resting on and interengaging the ramp 42. Such interengagement may be easily and readily effected by first resiliently compressing the element legs 54 toward one another until the extension heads 58 may be inserted through the slot portions 44, and then released to spread to normal position. The end edges of the element legs 54 will then ride on the upper surface of the marginal edge portions of the slot portion 46, while the inner edges of the extension heads 54 will underlie the undersides of the marginal edge portions of such slot portions to prevent removal of the element legs 54 from the ramps 42.

It may here be stated that the connecting neck 56 of the extensions of the bimetallic legs 54 may be sufficiently long to permit free sliding movement of the end edges of such legs on the upper surfaces of the ramps 42, but short enough to inhibit any tilting of the legs 54 that might bind them against movement in response to heat variation, either against ramps or the walls of the casing 10.

The bimetallic element 50 supports its apex, a valve pin 60, having a rounded upper end forming a valve head, 62, and a lower end, 64, of reduced thickness, providing the shoulders, 66. The reduced valve pin end 64 is disposed within a slot, 68, formed in the apex of the bimetallic element 50, with the shoulders 66 resting on the edges of the slot 68. The bimetallic element is of such a height that the valve pin 60 is normally, in the absence of heat, partly extended and held within the plug recesses 26 and 28, leaving space for the passage of air around it; but, upon the convergence of its legs, under the influence of heat, raises the valve pin, by the elongation of its legs 54 and by their convergent climbing upon the ramps 42, to seat valve head 62 in air-sealing position within the valve seat 28.

The casing 10 is provided with a closure, generally designated as 70, consisting of a generally flat wall, 72, having a continuous offset flange, 74, which is adapted to fit about the end, top and bottom walls of the casing 10, to be secured thereto, as by soldering. The closure wall 72 may be provided with an inwardly directed embossment, 76, in position to have at least portions thereof overlie and engage over the adjacent edge of the flat central portion 40 of the ramp or platform strip, to hold it down more securely in place.

It will be apparent that the positive engagement of the ends of the bimetallic element legs 54 with the ramps 42, as described above, will both, form a guide for and prevent displacement of the bimetallic element as its legs move up and down upon the ramps under temperature variations, to close and open the valve.

It will also be apparent that the bulging shape of the side wall 16 of the casing 10, especially at its lower portion, provides a space between the edge of the ramp strip and such wall for the drainage of water to the bottom of the casing for return flow through the opening 34 and nipple 36. It will also be seen that the guide slots 44–46 formed in the ramps 42 provide additional facilities for the drainage of water from above such strip to the bottom of the casing.

The valve of the present invention may be provided with the conventional means to make it responsive to any sudden inflow of water into the casing to close its air outlet, by means of an inverted bell-shaped element, 78, which is secured to an upper portion of the valve pin 60 by the edges of the opening, 80, formed in the top thereof, in the conventional manner.

This completes the description of the air-escape valve of the present invention. It will be readily apparent that numerous variations and modifications may be made therein by anyone skilled in the art, in accordance with the principles of the invention hereinabove set forth, and without the exercise of any inventive ingenuity. I desire, therefore, to be protected against any and all such variations and modifications that may be made within the spirit of the invention and the scope of the claims appended hereto.

What I claim is:

1. An air-escape valve of the character described comprising a valve casing including a pair of spaced convergent end walls, a side wall, a top wall connecting the upper edges of said side and end walls, a bottom wall connecting the lower edges of said side and end walls, and a closure for the other side of said casing, said top wall having an opening formed therein; a plug secured within said opening, said plug having a recess including a valve seat formed therein, facing the casing interior and a passageway connecting said valve seat with the exterior of the plug; a platform disposed within said casing at the bottom thereof, said platform comprising end portions rising inwardly and upwardly toward one another, forming ramps; a heat-responsive bimetallic element of substantially V-shape supported by the end of its leg portions in inverted position upon said ramps, said leg portions adapted to have their ends move toward one another under the influence of heat; a valve pin having a valve head at one end supported by said bimetallic element at the apex thereof with said valve head in said recess; and means at the ends of said bimetallic element legs engaging the underside of said ramps for guiding said leg ends upon said ramps and inhibiting the tilting of said element.

2. The air-escape valve of claim 1 wherein said platform and said bimetallic element each comprises a substantially rectangular strip, said platform strip being of a width equal substantially to the width of an end wall of said casing, and wherein the ends of said platform are fitted in the corners formed between the said bottom walls and said end walls.

3. The air-escape valve of claim 1 wherein said means on said bimetallic element legs for engaging the underside of said ramps comprise a hook extension on each of said leg ends.

4. The air-escape valve of claim 1 wherein said means on said leg ends for engaging the underside of said ramps comprise a T-shaped hook extension on each of said leg ends and a slot formed in each of said ramps, each of said hook extensions passing through one of said slots and engageable against the underside of said ramp.

5. The air-escape valve of claim 1 wherein said bottom wall is outwardly curved and is formed with an opening for a connecting nipple.

6. The air-escape valve of claim 1 wherein said bottom wall is outwardly curved and is formed with an opening having a connecting nipple and wherein said platform is of a width equal substantially to the width of said end walls, and wherein the lower portion of said side wall is outwardly bulged to provide a space between said platform and said side wall.

7. An air-escape valve of the character described comprising an open-sided casing, including a pair of spaced convergent end walls, a side wall, a top wall connecting the upper edges of said end and side walls, a bottom wall connecting the lower edges of said end and side walls, an opening formed in said top wall, a plug secured within said opening, said plug having a recess, including a valve seat portion formed therein, facing the interior of said casing, and a passageway connecting said valve seat portion with the exterior of the plug, said bottom wall having an opening formed therein adapted to have a connecting nipple secured therein, a platform at the bottom of said casing, said platform of a width equal substantially to the width of an end wall, and including divergent end portions forming ramps, said platform disposed with its end portions in upwardly and inwardly rising position, and with its end edges fitted in the corners formed at the junction of said bottom wall with said end walls; a heat-responsive bimetallic strip of substantially V-shape supported in inverted position on said platform, each of the legs of said bimetallic strip resting on one of said ramps, said bimetallic strip adapted to have its leg ends converge under the influence of heat, and means at the end of each of the legs of said bimetallic strip engageable against the underside of the ramp upon which it rests.

8. The air-escape valve of claim 7 wherein said side wall is formed with an outwardly bulging lower portion thereby providing a space between said side wall and the adjacent edge of said platform.

9. The air-escape valve of claim 7 wherein said open-sided casing is formed with a closure and wherein said closure is formed with an inwardly extending embossment in position to overlie an edge portion of said platform to retain it in place.

10. The air-escape valve of claim 7 wherein said ramps are each formed with a longitudinally extending slot having a widened end portion and wherein said means at the end of each of the legs of said bimetallic strip comprises a substantially inverted T-shape hook extension adapted to pass through said wider slot portion and engageable against the underside of the marginal edge portions of said narrower slot portions.

11. An air-escape valve of the character described comprising a housing, a valve seat provided in a wall portion of said housing, a passageway formed in the wall of said valve seat connecting with the exterior of the housing, a platform horizontally disposed within said housing opposite said valve seat, said platform including portions tapering inwardly toward said valve seat forming ramps, a bimetallic element of substantially V-shape, formed to have its legs converge under the influence of heat, supported in inverted position on said platform, the end edges of said legs each resting upon one of said ramps, a valve pin having a valve head supported on the apex of said bimetallic strip with its valve head reciprocably disposed within said valve seat and means on each of said leg ends extending past and below its supporting ramp and engageable against the underside thereof to steady said legs in their movement upon said ramps.

12. The air-escape valve of claim 11 wherein said means at the end of said legs comprises an extension projecting from each of said leg ends, said projecting extensions each including a dependent portion extending past its supporting ramp, said dependent portion having a laterally disposed extension having a straight edge underlying said supporting ramp.

13. The air escape valve of claim 11, wherein said means at the end of said legs comprises a T-shaped extension projecting from each of said leg ends, and wherein each leg supporting ramp is formed with a longitudinally extending slot, said slot having an enlargement at one end wherethrough said T-shaped projection is inserted for engagement against the underside of said ramp.

References Cited in the file of this patent
UNITED STATES PATENTS 574,962   Van Auken _____ Jan. 12, 1897